April 3, 1956  C. P. JEPPESEN  2,740,953
COMBINED THERMAL AND POWER FAILURE ALARM DEVICE
Filed Aug. 8, 1952  2 Sheets-Sheet 1
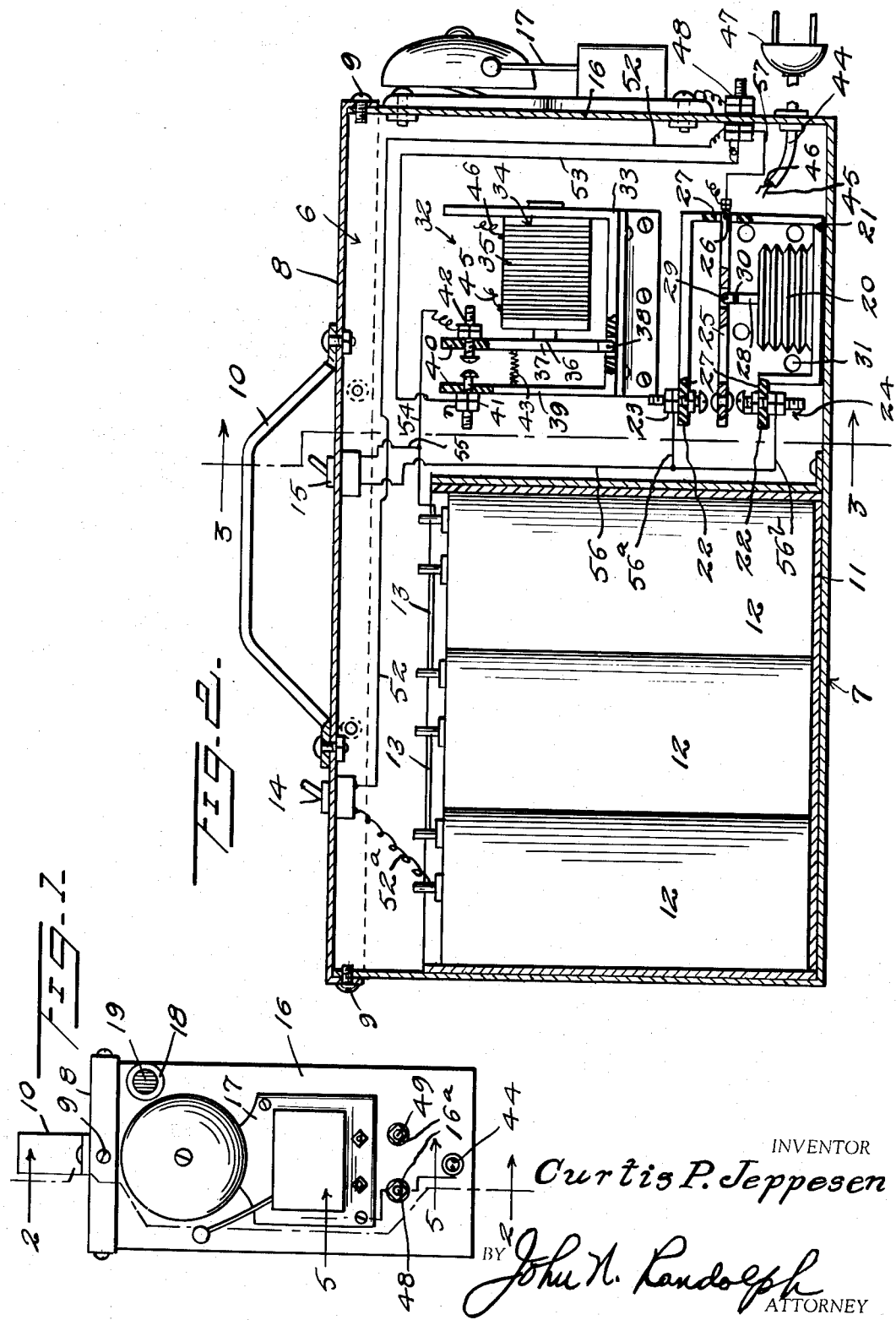
INVENTOR
*Curtis P. Jeppesen*
BY *John N. Randolph*
ATTORNEY April 3, 1956      C. P. JEPPESEN      2,740,953
COMBINED THERMAL AND POWER FAILURE ALARM DEVICE
Filed Aug. 8, 1952      2 Sheets-Sheet 2
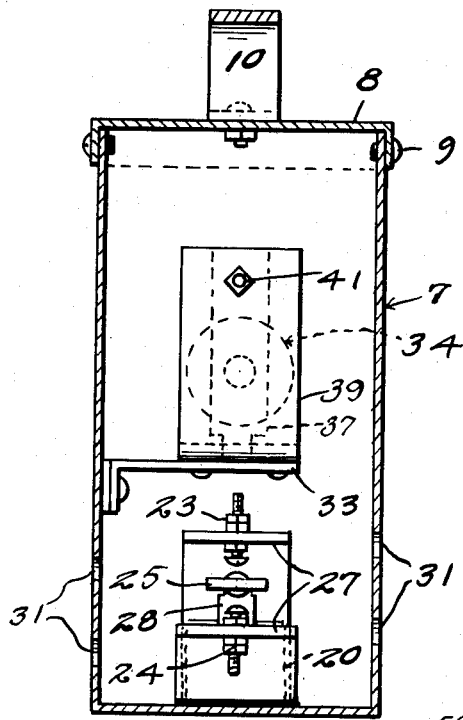
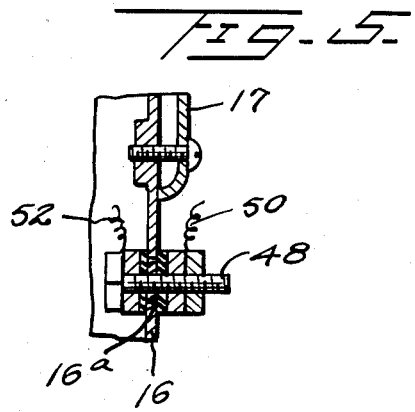
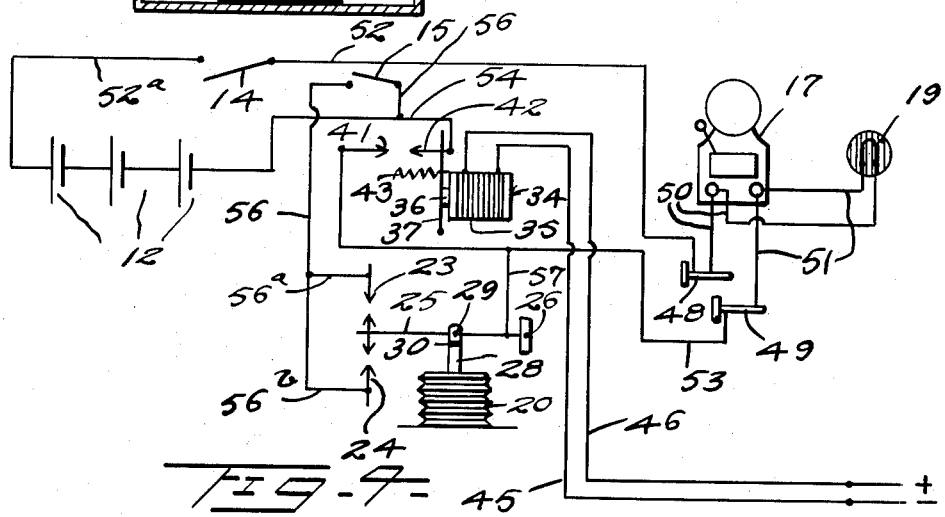
INVENTOR
*Curtis P. Jeppesen*
BY *John N. Randolph*
ATTORNEY United States Patent Office 2,740,953
Patented Apr. 3, 1956

2,740,953

COMBINED THERMAL AND POWER FAILURE ALARM DEVICE

Curtis P. Jeppesen, Driggs, Idaho

Application August 8, 1952, Serial No. 303,251

1 Claim. (Cl. 340—227)

This invention relates to a novel electrical warning device for energizing an audible or visual signal automatically to provide a warning of an electric power failure or of an increase or decrease in temperature beyond a predetermined range, and which may be effectively utilized in animal and poultry brooder houses, in refrigerated enclosures and elsewhere where electric current is required or where a temperature within a predetermined range must be maintained.

Still a further object of the invention is to provide an electric warning device capable of being utilized for numerous other purposes to either indicate temperature fluctuations, a break in an electric circuit or an electric power failure resulting from any cause.

Still another object of the invention is to provide an automatic electric warning unit of the type heretofore described capable of being assembled as a compact portable unit for use either in conjunction with a conventional alternating current source, or separately, if desired.

Various other objects and advantages of the invention will hereinafter become more fully apparent from the following description of the drawings, illustrating a presently preferred embodiment thereof, and wherein:

Figure 1 is an end elevational view of the warning device;

Figure 2 is an enlarged longitudinal sectional view thereof taken substantially along a plane as indicated by the line 2—2 of Figure 1;

Figure 3 is a cross sectional view of the unit taken substantially along a plane as indicated by the line 3—3 of Figure 2;

Figure 4 is a diagrammatic view illustrating the electric circuit of the apparatus, and Figure 5 is a fragmentary enlarged vertical sectional view taken substantially along a plane as indicated by the line 5—5 of Figure 1.

Referring more specifically to the drawings, the automatic warning device in its entirety is designated generally 6 and in its preferred form as illustrated includes a carrying case or housing 7 having a removable top wall or cover 8 affording access to the interior of the case 7 and which is normally retained in an applied position for closing the case by fastenings 9. The cover 8 is provided with a handle 10 on its outer side by means of which the case 7 and its contents may be readily carried as a portable unit. The case 7 is preferably formed of an electrical insulating material, for a purpose that will hereinafter become apparent, and is provided with a separate container 11 which is secured therein in any suitable manner to form a separate compartment in one end of the case 7 which contains one or more batteries. The compartment 11 is illustrated as containing a plurality of batteries 12 illustrated as being connected in series by conductors 13 but which could obviously be connected in parallel. It will also be readily apparent that a single self-contained source of electric current could be substituted for the plurality of batteries 12. The top wall or cover 8 is provided with two manually actuated electrical switches 14 and 15.

The end wall 16 of the case 7, which is preferably located remote to the compartment 11 and which is preferably formed of electrical insulating material, or at least has portions 16a formed of such a material, has a conventional electric bell 17 secured to the outer side thereof and also an electric socket 18 containing a light bulb 19, which is disposed externally of the wall 16. If desired, an electric buzzer of a conventional form may be substituted for the bell 17.

A bellows type thermostat 20 of a conventional type which is adjustable is mounted within the case 7 between the compartment 11 and end wall 16 and has a base portion thereof suitably supported on and secured to a frame 21 a part of which is preferably secured to the casing bottom. The frame 21 has spaced terminal portions 22 each of which supports an adjustable contact and binding post, one of which is designated generally 23 and the other of which is designated generally 24. An arm 25 of electrical conducting material is pivotally mounted at one end thereof at 26 in a part of the frame 21 and extends therefrom and has an opposite free end disposed loosely between adjacent ends of the contacts 23 and 24. The arm 25 is mounted for swinging movement toward and away from said contacts and toward and away from the thermostat 20. The frame 21 is either formed entirely of electrical insulating material or has portions thereof disposed around the pivot 26 and the contacts 23 and 24 which are formed of electrical insulating material, as indicated at 27, to electrically insulate the arm 25 and said contacts from one another. A stem or rod 28 is fixed to and projects from the free end of the thermostat 20 and is pivotally connected at 29 to an intermediate portion of the arm 25, said stem 28 preferably including a portion 30 of electrical insulating material for insulating the arm 25 from the thermostat 20. When the thermostat 20 is mounted in the case 7, as illustrated in the drawings, said case is preferably provided with ventilating openings 31 allowing air to circulate therethrough around the thermostat 20 and so that the temperature within the case 7 and adjacent the thermostat will correspond to the temperature around the exterior of the case 7.

A relay, designated generally 32, is supported in the case 7 preferably above and adjacent to the frame 21 by means of a frame 33 which may be secured in the case in any suitable manner. An electromagnet 34 of the relay 32 is supported by one end of the frame 33 and includes a winding 35 for energizing the core 36 to attract an armature 37. The armature 37 is pivotally mounted at one end thereof at 38 in a part of the frame 33 and is disposed for swinging movement between an end 39 of the frame 33 and the core 36. Said frame end 39 and the armature 37 are provided with free end portions 40 formed of electrical insulating material in which are mounted adjustable contacts and binding posts 41 and 42. The contact 41 of the frame end 39 constitutes a stationary contact and the contact 42 of the armature 37 constitutes a movable contact for movement into and out of engagement with the contact 41 and which is urged into engagement therewith and into a circuit closing position by means of a pull spring 43 which extends between and connects the frame end 39 and armature 37.

An electric cord 44, containing two insulated and encased conductors 45 and 46, extends outwardly through the end wall 16 and is provided at its outer end with a conventional male electric plug 47 which is adapted to be "plugged in" in a conventional manner to any suitable source of alternating current such as a conventional house current and which is intended to be plugged into an electric circuit supplying current to an animal or poultry brooder, a refrigerated enclosure or any other enclosure intended to be heated or cooled by electric current, not shown. The conductor wire 45 connects to one end of the winding 35 and the conductor wire 46 connects with the other end of said winding 35 so that when current is being supplied through the circuit to which the plug 47 is connected the electromagnet 34 will be energized and the armature 37 will be attracted by the core 36 and maintained in its position of Figure 2 so that the contacts 41 and 42 will be out of engagement with one another and the relay 32 will thus be maintained in an open or circuit interrupting position.

The electrically insulated portions 16a are provided with two binding posts 48 and 49 which are connected by conductors 50 and 51, as illustrated in Figure 4, to the binding posts or contacts of the audible signal 17 and the visual signal 18, 19, said conductors 50 and 51 connecting said signals to the binding posts 48 and 49, respectively, in series, so that both signals will be simultaneously energized and deenergized, as will hereinafter become apparent. It will also be apparent that either of the signals could be omitted as seen in Figures 2 and 4. A conductor 52 leads from the binding post 48 to one contact of the switch 14 and an extension 52a of said conductor extends between the other contact of the switch 14 to one terminal or post of the self contained current source 12. A conductor 53 extends from the other binding post 49 to the binding post and contact 41. A conductor 54 connects the other terminal of the current source 12 to the contact and binding post 42. A branch conductor 55 extends from the conductor 54 to one post of the switch 15 and a conductor 56 leads from the other post of the switch 15 and has branch portions 56a and 56b connecting respectively to the contacts and binding posts 23 and 24. The arm 25 is connected to the post 49 either directly or through the conductor 53 by a conductor 57.

Assuming that electricity must be supplied to a particular enclosure, apparatus or other means and that it is desirable or essential that a warning be given of any failure of the electrical supply, the plug 47 is suitably connected in the circuit of the current supply so that current from the current source will pass through the winding 35 to energize the core 36 to attract the armature 37 to maintain the contacts 41 and 42 in an open or circuit interrupting position. Assuming that the switch 14 has been manually closed, should the current from the source to which the plug 47 is connected fail for any reason or should a fuse be blow in the circuit, this will cause interruption of the current passing through the conductors 45 and 46 so that the relay 32 will be de-energized allowing the spring 43 to swing the armature 37 toward the frame end 39 so that the contacts 41 and 42 will assume a circuit closing position to close a circuit from the self contained current source 12 to the audible signal 17 and visual signal 18, 19 through conductor 54, contacts 41, 42, conductor 53, post 49 and conductor 51 to the signal and through conductor 50, post 48 and conductor 52, switch 14 and conductor 52a back to the self contained current source 12 to thus energize the signals 17 and 18, 19 when the relay 32 is de-energized. For such use, the unit 6 may be disposed at any distance from the enclosure or apparatus being supplied with the current in the circuit of which the plug 47 is connected. Similarly, if it is desired to maintain a temperature within a predetermined range within an enclosure, not shown, for example, the unit 6 may be disposed therein and connected as previously described to the circuit supplying electricity to said enclosure so as to provide a visual and audible warning signal should such current supply fail, as previously described. Likewise, should the temperature rise or fall above or below a desired maximum or minimum, the signals will likewise be energized. For example, as the temperature rises the thermostat 20 will expand and if the temperature rises sufficiently the arm 25 will engage the contact 23. Assuming that the switch 15 is closed, current can then pass through conductors 54 and 55, switch 15, conductors 56 and 56a, contact 23 and arm 25, conductors 57 and 53, contact post 49 and conductor 51, through the signal and back through conductor 50, contact post 48, conductor 52, switch 14 and conductor 52a back to the self contained current source 12. It will be obvious that this can occur independently of a current failure to the relay 32 and that by disconnecting the spring 43 the circuit just previously described of the unit 6 could be utilized without the unit 6 being connected to a current source by its plug 47. Substantially the same circuit will be closed by a temperature drop causing contraction of the thermostat 20 and movement of the arm 25 into engagement with the contact 24, which circuit differs only from the circuit just previously described in that instead of the branch conductor 56a and contact 23 constituting a part of the circuit, the branch conductor 56b and contact 24 function to connect the arm 25 and conductor 56.

It will also be apparent that the signals 17 and 18, 19 could be disposed at any position remote to the case 7 by lengthening the conductors 50 and 51 or the thermostat with its frame 21 could be mounted remote to the case 7 by merely lengthening the conductors 56 and 57 so that the signals could be energized at points any desired distance from an enclosure or apparatus with which the warning device 6 is utilized.

Various other modifications and changes are contemplated and may obviously be resorted to, without departing from the spirit or scope of the invention as hereinafter defined by the appended claim.

I claim as my invention:

An electrically actuated warning device comprising at least one electrically energized warning signal, a self-contained current source electrically connected to the warning signal, a relay interposed in the circuit of the self-contained current source and signal and adapted to be connected to and actuated by a separate current source for maintaining the relay in a position for interrupting the circuit to the warning signal whereby said warning signal will be energized by the self-contained current source when the relay is de-energized, a second circuit connecting the self-contained current source and said warning signal, a thermostatically actuated switch interposed in said second circuit for closing the second circuit to energize the warning signal independently of the de-energizing of the relay in response to an increase or decrease in temperature beyond a predetermined range, and a manually actuated switch interposed in said second circuit to prevent or interrupt actuation of the warning signal resulting from a closing of the thermostatically actuated switch and for indicating by operation thereof, when the warning signal is energized, whether operation of the warning signal is being caused by failure of the separate current source or by the existence of an abnormal temperature causing a closing of the thermostatically actuated switch.

References Cited in the file of this patent

UNITED STATES PATENTS

| Number | Name | Date |
|---|---|---|
| 1,179,276 | Bullock | Apr. 11, 1916 |
| 2,029,402 | Alexander | Feb. 4, 1936 |
| 2,185,361 | Towne | Jan. 2, 1940 |
| 2,439,331 | Bean | Apr. 6, 1948 |
| 2,501,793 | Sperry | Mar. 28, 1950 |
| 2,514,807 | Shaw | July 11, 1950 |
| 2,526,679 | McCary | Oct. 24, 1950 |
| 2,596,704 | Malutich | May 13, 1952 |
| 2,609,431 | Faltz | Sept. 2, 1952 |
| 2,663,858 | MacInnes et al. | Dec. 22, 1953 |